United States Patent [19]

Keller

[11] Patent Number: 4,707,606

[45] Date of Patent: Nov. 17, 1987

[54] PROPORTIONAL COUNTER FOR DETECTING SURFACE CONTAMINATIONS

[75] Inventor: Manfred Keller, Jülich, Fed. Rep. of Germany

[73] Assignee: Kernforschungsanlage Jülich Gesellschaft mit beschränkter Haftung, Jülich, Fed. Rep. of Germany

[21] Appl. No.: 658,114

[22] Filed: Oct. 5, 1984

[30] Foreign Application Priority Data

Oct. 8, 1983 [DE] Fed. Rep. of Germany ....... 3336666
Nov. 5, 1983 [DE] Fed. Rep. of Germany ....... 3340072

[51] Int. Cl.[4] .......... G01T 1/18
[52] U.S. Cl. .......... 250/374; 250/515.1
[58] Field of Search .......... 250/374, 515.1, 517.1

[56] References Cited

U.S. PATENT DOCUMENTS

| | | | |
|---|---|---|---|
| 2,505,919 | 5/1950 | Simpson, Jr. | 250/374 |
| 2,509,700 | 5/1950 | Simpson, Jr. | 250/374 |
| 2,965,759 | 12/1960 | Eberline | 250/374 |
| 2,968,731 | 1/1961 | Davis et al. | 250/374 |
| 3,110,835 | 11/1963 | Richter et al. | 250/374 |
| 3,346,754 | 10/1967 | Natanagara et al. | 250/374 |

FOREIGN PATENT DOCUMENTS 1071242 12/1959 Fed. Rep. of Germany .

OTHER PUBLICATIONS

"Air Proportional Counters", J. A. Simpson, Jr., The Review of Scientific Instruments, vol. 19, No. 11, Nov. 1948.

*Primary Examiner*—Janice A. Howell
*Attorney, Agent, or Firm*—Nils H. Ljungman

[57] ABSTRACT

Proportional counters for the detection and measurement of radioactive surface contaminations are provided with at least two flat window faces enclosing an angle and being formed by a thin foil spread or stretched by a framework including thin rods arranged along the inner edges of contacting window faces, to which rods the foil may be adhered. A perforated lattice or grid cage serves in particular to protect the thin window against any contact, the cage provides for a spacing of about double rod thickness between the framework and the controlled surface. Preferred is a polygonal and in particular hexagonal lattice whose grid wires or strips do not lie in the main scanning direction. Particularly convenient for checking pipelines are, for example, cylindrical measuring probes comprising window foils extending over and perhaps adhered to a circularly arranged frame of thin rods.

9 Claims, 10 Drawing Figures

PROPORTIONAL COUNTER FOR DETECTING SURFACE CONTAMINATIONS

BACKGROUND OF THE INVENTION

1. Field of the Invention

The invention relates to a proportional counter used as a measuring probe for the detection and measurement of radioactive surface contaminations comprising a case with thin-walled radiation entrance window made of a film or thin foil fixed to the case along the film edge and with a "contact safety device" protecting the window against accidental contact and with a connecting base or cap.

2. Description of the Prior Art

When working with radioactive substances, in particular with $\alpha$- and $\beta$- emitters it is imperative to check objects, facilities, equipment, workplaces etc. for radioactive contamination of their surfaces, i.e. the surface contamination must be determined. Such checking is legally required both in radiation protection monitoring and for the release of materials from nuclear facilities for harmless further utilization. Although large quantities of material have accumulated worldwide as so-called radioactive wastes, there is a lack of suitable measuring equipment, in particular of suitable detectors for measuring these materials either for release as material free of radioactivity or as material for recovery in recycling processes.

Large-area proportional counters have heretofore been used preferentially for measuring surface contaminations. The possess a plane window made of as thin a metallized film as possible having a mass density of preferably about 1 mg/cm$^2$, which extends over one face of a flat counter body or case for the entrance of radiation into the measuring volume. Readily available counter gases are used as measuring fluids. The operation of proportional counters is described e.g. by H. Neuert in "Kernphysikalische Meverfahren" , published by G. Braun, Karlsruhe, 1966.

Protection of the thin window is assured, as can be seen from Ref. Sci. Instr. Vol. 19, No. 11 (1948), pp. 733 –743, by an adjacent thin screen acting as a contact safety device, which may be drawn and attached like a cage around the longitudinal edges of large-area planar counters.

Such plane counters only have a limited field of view so that a tubular "film wall counter" with a bearing frame has already been proposed (DE-AS 1 071 242) in which a thin film hose is slipped over the front face of cylindrical insulators adequately spaced for stretching the film by means of a communicating support provided outside the film tube. Such film wall tubes are capable of covering larger solid angles. It has been found, however, that the film selected must be relatively thick to avoid problems arising in connection with elongations caused by the supply of counter gas or the effects of the electrical field between the metallized film and the counting wire. Very weak radiation is therefore hardly detected by such a probe.

The known proportional counters are thus not suited for adequately detecting contaminations accumulating preferentially in such locations as corners and angular spaces. A satisfactory approach to monitoring pipelines and channels has not been found either.

SUMMARY OF THE INVENTION

The problem addressed by the invention is therefore to develop sensitive measuring probes with an improved field of view as compared to the known measuring sensors. This problem is solved by a measuring probe of the type described above, which is characterized by at least two plane window faces enclosing an angle and by a framework of thin rods arranged along the inner edges of contacting window surfaces, over which rods the window film is extended and/or adhered, as well as by a contact safety device providing for a spacing (d) of at least double rod thickness between the window surfaces and the surface to be checked.

The contact safety device can be provided by any arrangement, such as e.g. spacers, ensuring that there is no contact between the thin-walled window and any surfaces to be monitored. This purpose is served preferentially, however, by the provision of an open-meshed screen arranged with an adequate spacing in front of the windows of at least said minimum.

Such thin-walled faces and the arrangement of a contact safety device, as in particular a perforated lattice cage, providing for a certain spacing of a few mm between the contaminated surface and the body edges of the frame, may improve the field of view of the counter as will be apparent upon reference to FIG. 8 of the accompanying drawings explained further below

BRIEF DESCRIPTION OF THE DRAWINGS

The invention is described in more detail hereinbelow on the basis of exemplary embodiments shown in schematic form by the accompanying drawings.

DETAILED DESCRIPTION

The drawings in FIG. 8 show the arrangement of a known measuring probe (a), a measuring probe with a thin-walled frame and spaced contact safety device (b) as well as an arrangement according to the invention with the side wall provided by a window film on a rod frame and with a spaced contact safety device (c).

Figure 2:
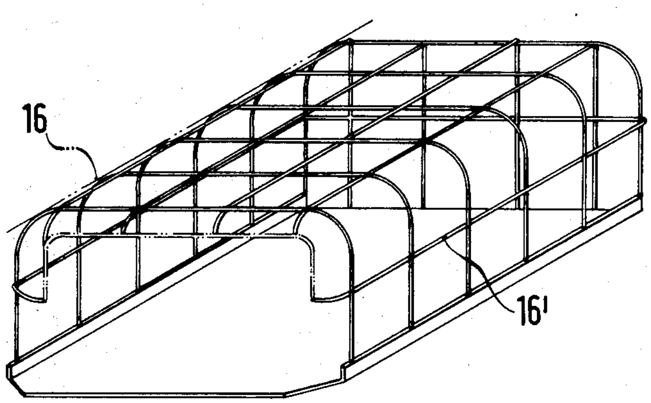
FIGS. 2 and 3 show two different embodiments of the contact safety device.
Figure 3:
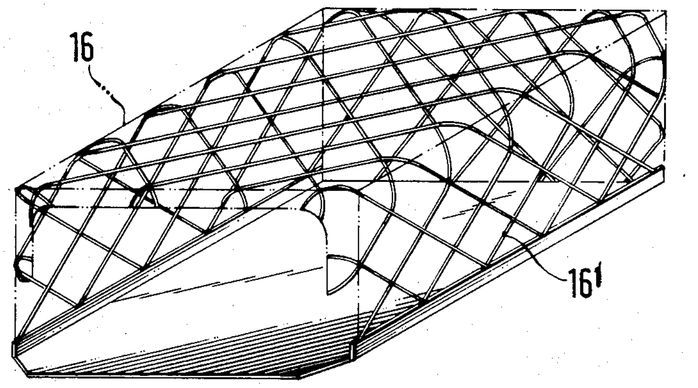
Figure 8A:
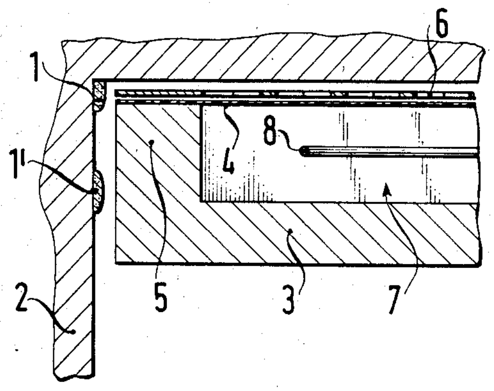
FIG. 8*a* to 8*c* are drawings to explain the invention.
Figure 8B:
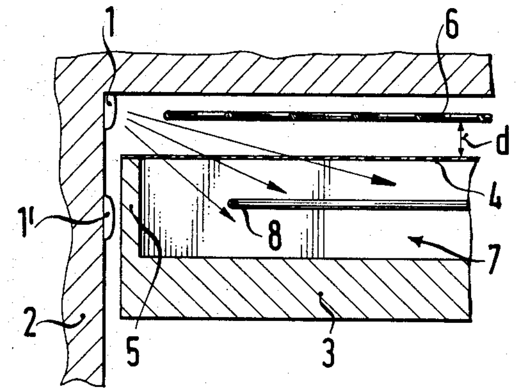
Figure 8C:
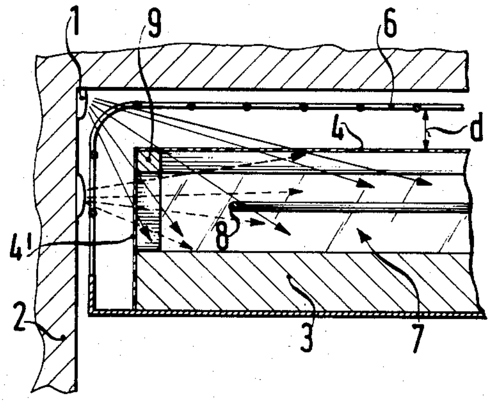

According to FIG. 8*a*, a contamination 1 in the corner of a wall area 2 is to be detected by the proportional counter 3. This counter has a window 4 formed by a thin-walled metallized film of about 1 mg/cm$^2$ weight/unit area, which is supported by a thick-walled frame 5 and protected against damage by a virtually abutting protecting grid 6. The window 4 closes the counter volume 7 into which the counter gas is introduced and in which charged counter wires 8 are spanned opposite the walls. As can be seen from FIG. 8*a*, the radiation of contamination 1 is completely screened by the frame 5 in the known counter and does not enter the counter volume. In contrast, the contamination 1 can be detected by means of the proportional counter according to FIG. 8*b* with a thin-walled frame 5 of about 1–2 mm wall thickness if the contact safety device 6 is arranged at a distance d from the window 4. Of particular advantage is the arrangement according to FIG. 8*c*, in which the side wall of the frame 5 is formed by a window film 4' stretched between rods 9 along the body edges of said frame supplemented by the base plate. Device 6 arranged at the distance d is formed by a perforated lattice of about 10 mm mesh width with strips or bars offset in particular from the body edges or periphery of the cage, as is illustrated by FIGS. 2 and 3. It is of further particular advantage that contaminations extending into the lateral wall region (simplified by contamination 1') are also detected by this counter.

Especially when providing a contact safety device as shown in FIG. 3, no surface region is excluded from detection for remaining behind any bar parallel to the direction of motion when moving the measuring probe in the usual way parallel to its body edges.

Figure 1:
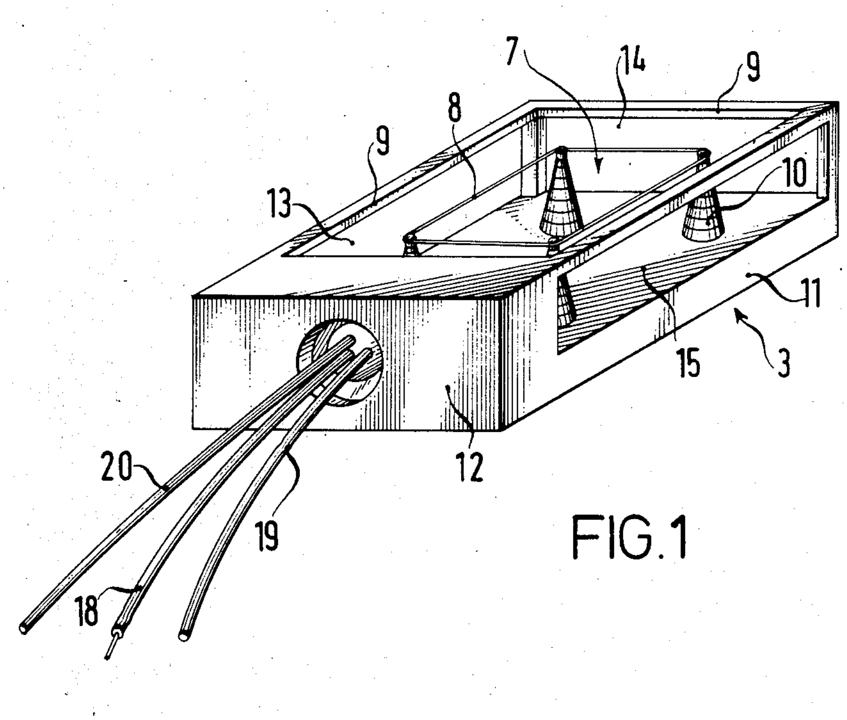
FIG. 1 shows the frame of a measuring probe according to the invention without window film and contact safety device.

FIG. 1 shows an embodiment of the invention for contamination monitoring, in particular of surfaces formed by plane walls. The counter 3 is essentially formed by a counter volume 7, in which counter wires 8 are stretched which are charged opposite the side walls. The counter wires are stretched by means of insulator elements 10 on a frame plate 11 extending from a connecting base 12. The "main window" (not shown) of up to approx. 100 $cm^2$ covers the frame formed by thin square rods 9 of 1 to 2 cross-sectional edge length, the sides 13, 14, 15 of said frame being equally formed by a window film stretched between thin rods together with the base plate, which film is adhered onto the rods.

A low-shading perforated plate or lattice (made of metal or plastic), as shown in FIG. 2 and specifically in FIG. 3, is mounted above the arrangement shown in FIG. 1 after bonding the window film and provides for a spacing of about 2 mm to 10 mm, particularly 4 mm (depending on the type of radiation) between the window 4, 4' and the outer surface of the contact safety device. The guard cages 16 formed by a perforated lattice or grid has bars or strips or wires 16' offset from the body edges of the cage according to FIG. 2. Particularly convenient is the arrangement shown in FIG. 3 in which the bars of the lattice form a sizeable angle with the body edges of the cage.

Figure 4:
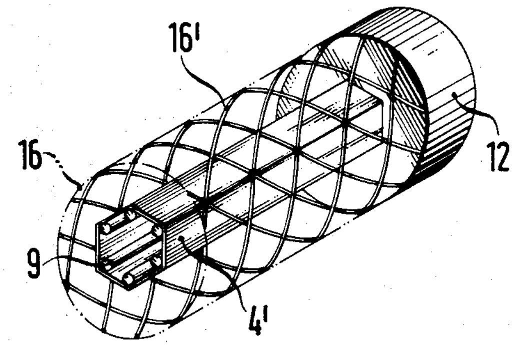
FIG. 4 shows a tubular proportional counter.

For the monitoring of tubes a geometrically adapted measuring probe according to FIG. 4 is provided in which the side walls are formed by a window film 4' extended between a circularly arranged frame of thin rods 9. The connecting base 12 rising above the cross section of the counter volume enclosed by the film 4' carries a guard cage 16 in the form of a perforated lattice whose bars 16' are not arranged in the direction parallel to the axis, but form a rhombic pattern as indicated in FIG. 3. The contact safety device could also be provided as a helically wound structure or a square mesh lattice with staggered strips or bars or wires.

Particularly convenient and readily available is a polygonal and in particular hexagonal lattice whose bars always form an angle with the main scanning direction.

Figure 5:
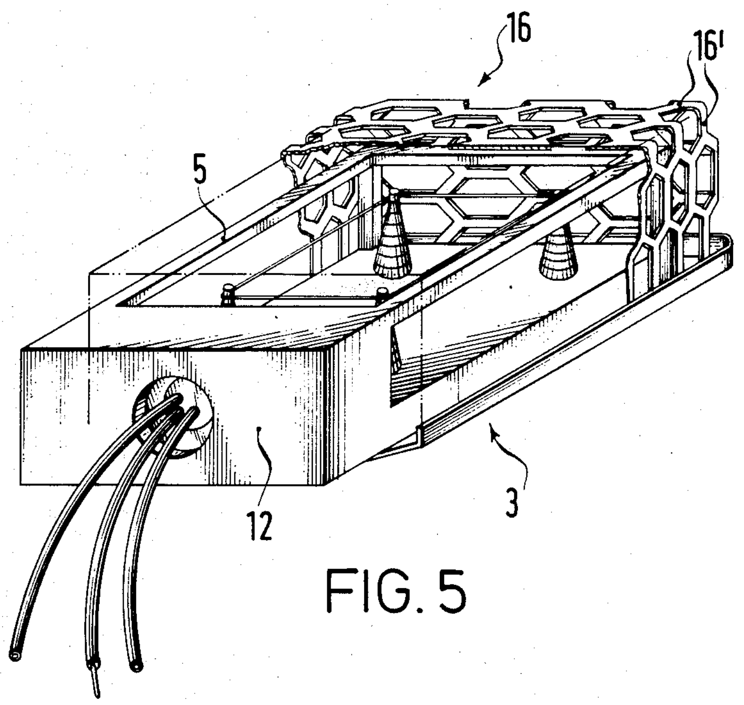
FIGS. 5 and 6 show a flat counter with a perforated lattice cage formed by a hexagonal screen.
Figure 6:
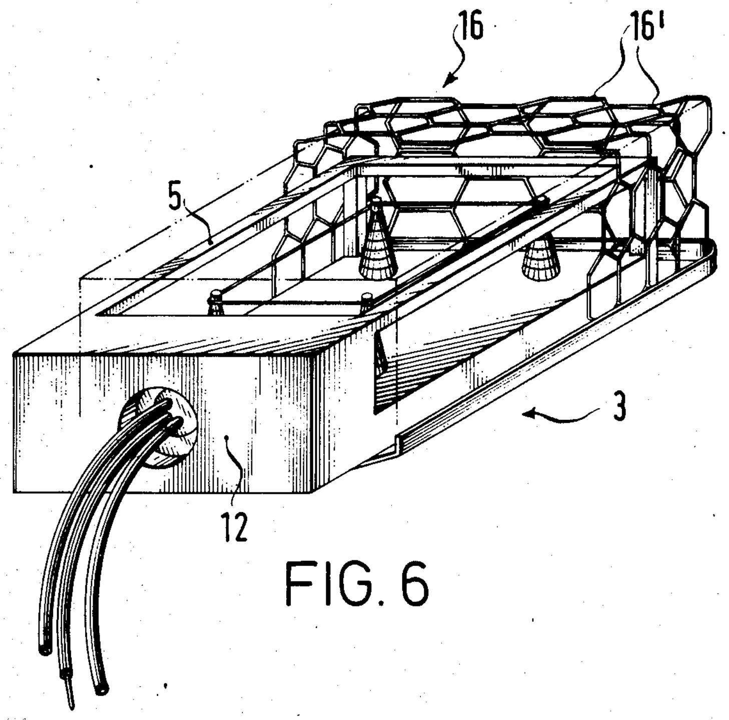

FIGS. 5 and 6 show such an embodiment: As can be seen, the proportional counter 3, whose thin window is stretched over a frame 5 on the base 12, is screened by a spaced perforated lattice cage 16 with hexagonal holes whose bars 16' do not coincide with the main sampling direction of the proportional counter assumed to be longitudinal, so that no permanently shaded areas can result when systematic scanning of surfaces for contamination monitoring is done.

This polygonal lattice cage arrangement is particularly suitable for cylindrical counters used to check pipelines having only one main sampling direction.

The bars of the perforated lattice shown in FIG. 5 are relatively broad but can, of course, also be made very thin, an can be seen in FIG. 6.

Figure 7:
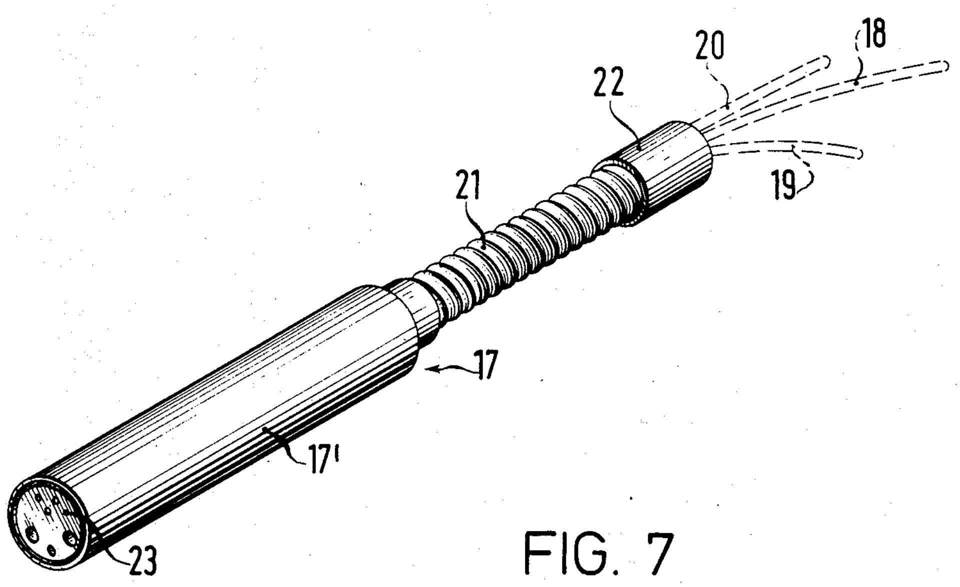
FIG. 7 shows a flexible handle of the measuring probes.

FIG. 7 finally shows a bar-shaped handle 17 engaging the connecting cap 12 and providing a passage for the gas and power supply lines (dashed) 18, 19, 20 and which may be of stay- flexible design in the form of a helically wound spring steel wire hose 21. This flexible design of the probe handle will considerably improve the monitoring of relatively inaccessible regions. This handle 17, which is screw threaded at the end 22 into the cap 12 of the measuring probe, accommodates in its actual handle portion 17' the input discriminator for the pulse shaping of discharges initiated in the counter. The handle is provided with a socket insert 23 comprising electrical contacts and counter gas bushings at the end opposite the cap connection.

While the foregoing describes and illustrates certain present preferred embodiments of the invention, it is to be understood that the invention is not limited thereto and that the invention may be otherwise variously practiced within the scope of the following claims.

What is claimed is:

1. A proportional counter as a measuring probe for the detection of radioactive surface contaminations having: a case with thin-walled radiation entrance window faces made of a film fixed to the case along the edge of said film; a contact safety device; and a connecting base, said proportional counter comprising:

said entrance window faces comprising at least two planar window faces;

at least two of said at least two planar window faces comprising said film and having the faces thereof disposed at an angle other than 180° with respect to one another; and said case comprising a framework connected to said base, said framework including at least one elongated frame member arranged to form the edges of said at least two planar window faces and making contact with said window film being mounted in contact with said at least one elongated frame member, said at least one elongated frame member having a width dimension from the edge of one of said at least two planar window faces being disposed on a first side of said at least one elongated frame member to the edge of another of said at least two planar window faces being disposed on a side of said at least one elongated frame member opposite its first side, said case enclosing a radiation sensitive volume having counting elements disposed therein; as well as said contact safety device being disposed to provide, in use, a spacing (d) of at least double said width dimension of said at least one elongated frame member between said at least two planar window faces and the surface to be checked.

2. A proportional counter according to claim 1, in which said contact safety device is formed by a perforated lattice cage with grid strips offset from its body edges.

3. A proportional counter according to claim 2, characterized in that said grid strips form an angle with the main body edges of the cage.

4. A proportional counter according to claim 1, of cylindrical shape for monitoring concave bent and in particular cylindrical surfaces as in pipelines, characterized in a circular arrangement of said at least one elongated frame member spanned by said window film as the cylinder jacket and in that said grid bars of said cage-type contact safety device are not continuous in the direction parallel to the axis of said cylinder.

5. A proportional counter according to claim 1, in which said safety device is formed by a polygonal lattice whose grid bars do not lie in the main scanning direction.

6. A proportional counter according to claim 5, characterized in that said polygonal lattice is a hexagonal lattice.

7. A proportional counter according to claim 1, comprising a bar-shaped stay-flexible handle engaging said connecting base to provide a passage for the counting gas as well as power feed lines and comprising a socket insert at the opposite end.

8. The proportional counter according to claim 1 wherein said at least one elongated frame member comprises rods.

9. A radiation counter having a radiation detection means disposed within a measuring probe structure, said radiation counter being for detection of radioactive surface contaminations, said measuring probe structure comprising:

a framework comprising a plurality of elongated frame members being disposed to make at least two planar window openings and at least partially surrounding said radiation detection means;

film means being disposed adjacent to and in contact with said framework to form radiation permeable windows for said at least two planar window openings;

at least two of said at least two planar window openings being disposed at an angle, with respect to one another, other than 180°;

at least one of said elongated frame members comprising edges of two adjacent planar window openings of said at least two planar window openings, said at least one elongated frame member having a width dimension between said edges of said two adjacent planar window openings; and a structure disposed about and from said framework for keeping said framework at a distance from a surface to be checked, said distance being about twice as great as said width dimension of said at least one elongated frame member, whereby said film means is protected from mechanical damage and whereby interference of said framework with radiation to be measured by said radiation detector means is minimized.

* * * * *